No. 897,973. PATENTED SEPT. 8, 1908.
S. P. FOSTER.
RELEASING DEVICE FOR CHECKREINS.
APPLICATION FILED FEB. 13, 1908.
2 SHEETS—SHEET 1.
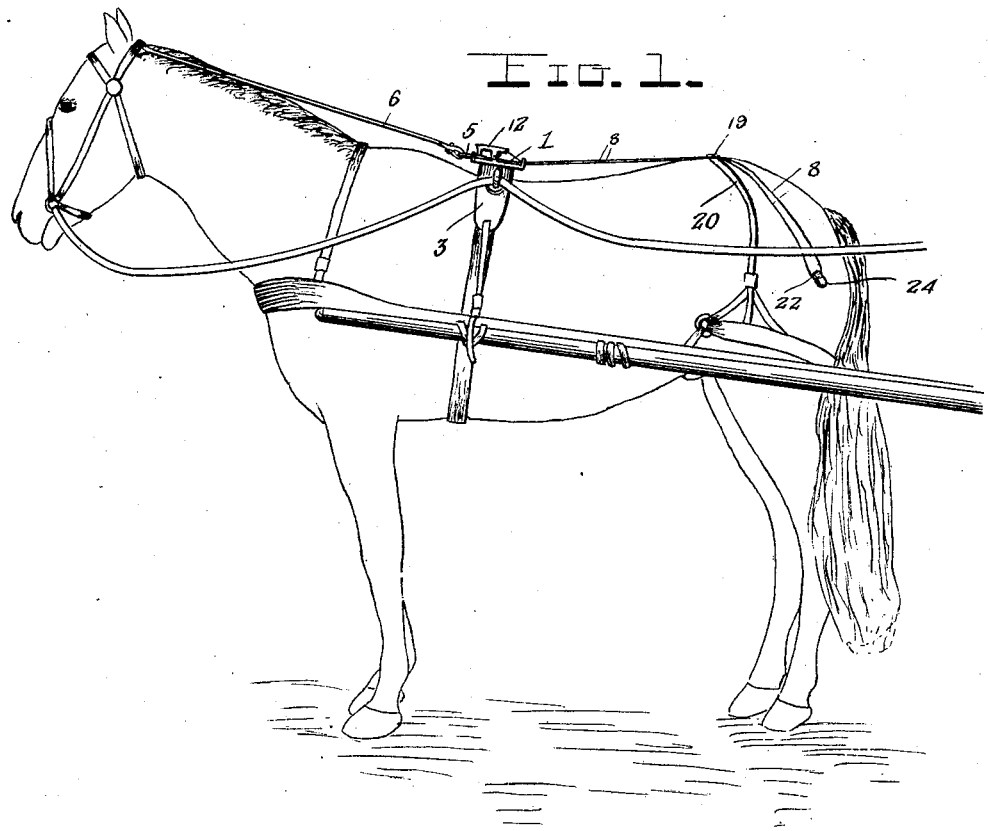
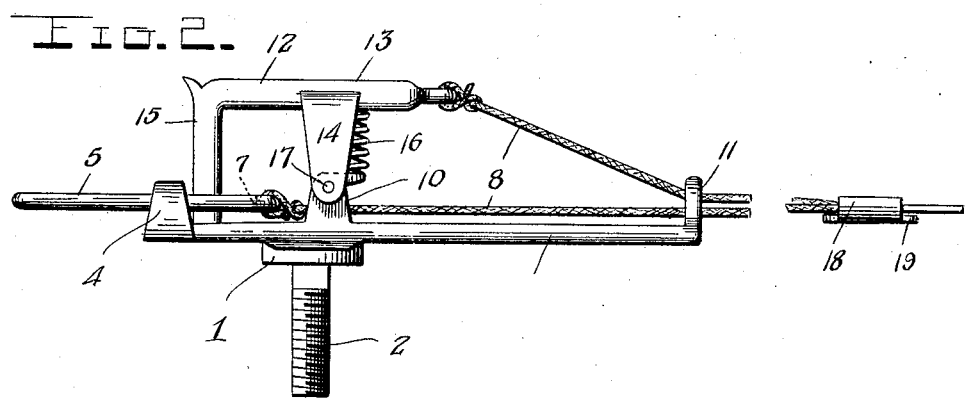
Witnesses
Chas. L. Griesbauer.
C. H. Griesbauer.
Inventor
S. P. Foster
By H. B. Willson & Co.
Attorneys

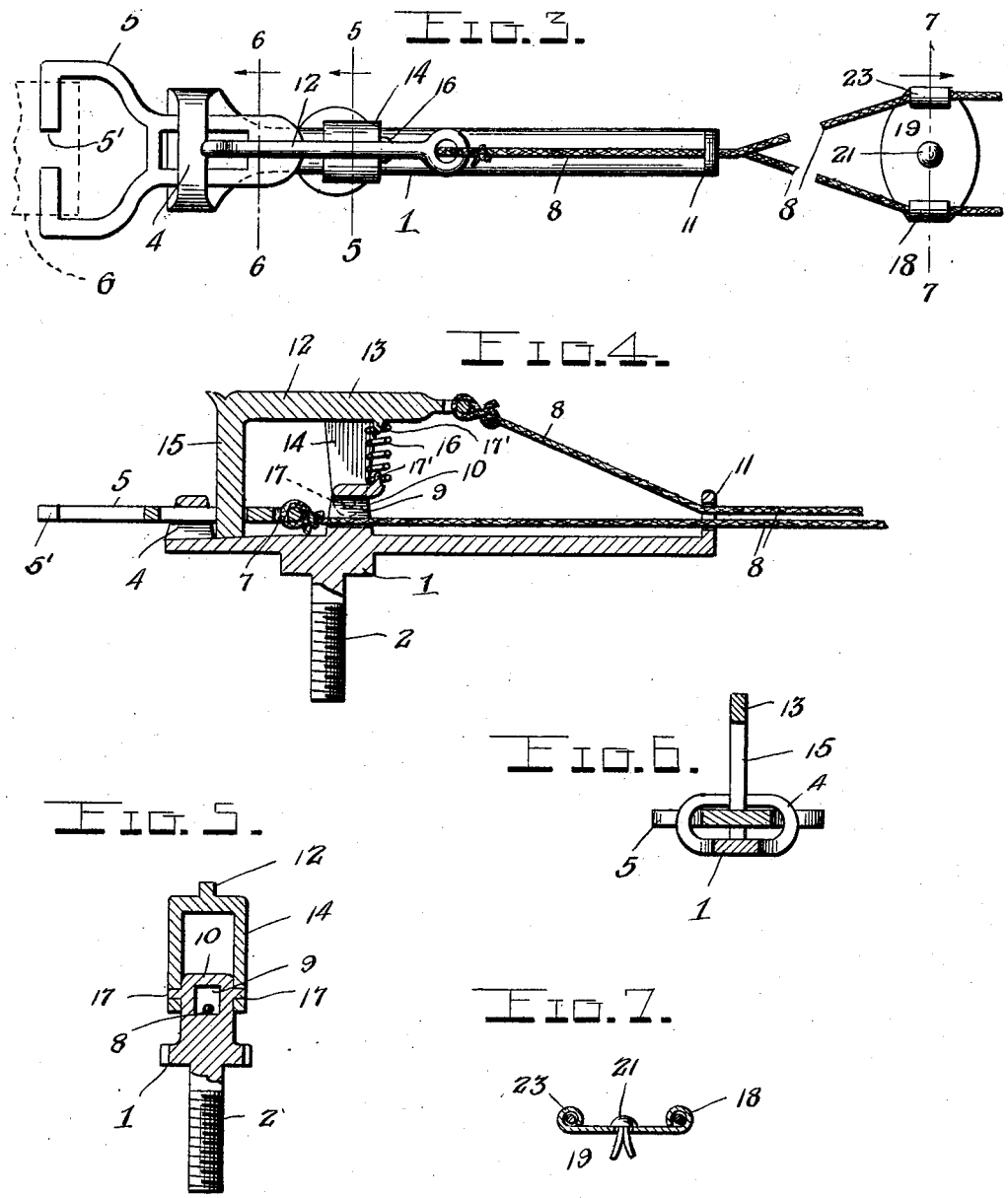

UNITED STATES PATENT OFFICE.

SAMUEL P. FOSTER, OF CHATTANOOGA, TENNESSEE, ASSIGNOR OF ONE-HALF TO CHARLES A. BEDELL, OF EAST CHATTANOOGA, TENNESSEE.

RELEASING DEVICE FOR CHECKREINS.

No. 897,973.　　　Specification of Letters Patent.　　　Patented Sept. 8, 1908.

Application filed February 13, 1908. Serial No. 415,738.

*To all whom it may concern:*

Be it known that I, SAMUEL P. FOSTER, a citizen of the United States, residing at Chattanooga, in the county of Hamilton and State of Tennessee, have invented certain new and useful Improvements in Releasing Devices for Checkreins; and I do declare the following to be a full, clear, and exact description of the invention, such as will enable others skilled in the art to which it appertains to make and use the same.

This invention relates to new and useful improvements in releasing devices for check reins and has for its principal object the production of a simple and efficiently operating device of this kind whereby the check rein may be released from its engaged position to permit the horse or other animal attached to the vehicle to drink without requiring that the driver or other occupant of the vehicle leave his seat to either release the check rein or to place it in engaged position after the thirst of the animal has been quenched.

With the foregoing and other objects in view, the invention resides in certain novel features of construction, combination and arrangement of parts, as will be more fully described and particularly pointed out in the appended claims.

In the accompanying drawings, Figure 1 is a view illustrating the application of the invention, Fig. 2 is an enlarged view in side elevation of the invention detached from position, with parts broken away, Fig. 3 is a plan view of Fig. 2, Fig. 4 is a central longitudinal sectional view of Fig. 3, Fig. 5 is a cross section taken on the plane indicated by the dotted lines 5—5 of Fig. 3, Fig. 6 is a cross section taken on the plane indicated by the dotted lines 6—6 of Fig. 3, Fig. 7 is a cross section taken on the lines 7—7 of Fig. 3.

In the embodiment illustrated, which is for illustrative purposes only and therefore not drawn to scale, the numeral 1 indicates the supporting plate of the device, which is formed with a depending threaded stem or screw 2, preferably at a point near its forward end, said stem or screw being designed to screw into the saddle 3 of the harness to hold the supporting plate in removable position thereto. Said plate is also formed at its extreme forward or front end with a guide loop or ring 4 through which is arranged to slide a connecting link 5, formed with a front centrally split cross-piece 5' to which may be detachably connected the check rein 6. The rear end of the connecting link is preferably apertured as at 7 to receive one end of an operating cord or element 8, which is arranged to pass through openings 9 formed in upright lugs or extensions 10 and 11 respectively, the former of which is arranged near the front end of the supporting plate and the other of which is arranged at the extreme end of the same.

The numeral 12 indicates a suitable latch device. This device comprises a longitudinally disposed body portion 13 formed at a suitable point intermediate of its ends with two laterally spaced inwardly projecting supporting legs 14, formed with apertures at their lower ends to receive corresponding lugs or extensions 17, extending from opposite sides of the upright lug or extension 10. The body portion of the latch device is also formed at its front end with an inwardly extending or depending finger or extension 15, adapted to normally engage with the inner end of the connecting link 5, said finger being normally held in engaged relation with the connecting (or check rein engaging) link by the action of a resilient element preferably in the form of an upright coil spring 16, arranged between the upright lug or extension 10 and the free end of the body portion of the latch device, the spring being detachably held in position by pins or extensions 17', designed to project into opposite ends of the same. The operating cord or element 8, after having been inserted or passed through the guide openings of the upright lugs or extensions 10 and 11 respectively, is next inserted through a guide loop 18 formed at one end of a flat guide plate 19, attached to the back band 20 of the harness by a suitable fastening device 21. The operating cord or element is then extended to form a loop 22, which normally rests on one hip of the animal, after which operation it is next inserted through a guide loop 23 formed at the end of the guide plate opposite to the guide loop 18 and also through the upright guide loop or extension 11, and is attached to the free end of the body portion of the latch device. A finger piece 24 is arranged at the outer end of the loop 22 of the operating cord or element, said finger piece being in the form of a clip bent centrally upon itself.

In practice, when it is desirable to release the check rein, the operator grasps the finger piece or clip 24 and raises the looped end of the operating cord or element, after which operation he pulls rearwardly on the end of the cord connected with the latch device, which operation swings the finger of the latter upward in disengagement from the connecting link 5 to which the check rein is attached. The horse or other animal is then permitted to freely bend its neck to drink as it is not hampered by the check rein. After the animal has quenched its thirst, the check rein engaging link is brought into its normal or initial position by the operator pulling rearwardly on the end of the operating cord attached to the same, after which operation the first mentioned or opposite end of the cord is released to permit the finger of the latch device to again engage the rear end of the check rein engaging link.

While I have shown and described the preferred embodiment of the invention it is to be understood that various changes in the form, proportion and minor details of the construction may be resorted to within the scope of the appended claims.

Having thus described my invention, what I claim as new and desire to secure by Letters-Patent, is:—

In combination with a harness saddle, a releasing device for check reins comprising a supporting plate having a depending threaded stem to screw into the saddle and a pair of longitudinally spaced upstanding guide extensions, a check rein engaging link, a latch device having a pair of laterally spaced depending supporting legs and a depending link engaging portion, pivotally mounted upon the front guide extension, an upright spring arranged between the body of the latch device and the front guide extension, pins projecting from the body of the latch device and the front guide extension into opposite ends of said spring, an operating cord, one end extending through the rear guide extension and attached to the pivot end of the latch device body and the opposite end thereof through the other guide extension and connected with the check rein engaging link, and guide means detachably connected with the harness for receiving opposite portions of the operating cord.

In testimony whereof I have hereunto set my hand in presence of two subscribing witnesses.

SAMUEL P. FOSTER.

Witnesses:
  JAMES H. ANDERSON,
  ROY F. MCCLURE.